US012687056B2

(12) United States Patent
Smith

(10) Patent No.: US 12,687,056 B2
(45) Date of Patent: Jul. 21, 2026

(54) WINDOW LATCH

(71) Applicant: Martasz Smith, Chicago, IL (US)

(72) Inventor: Martasz Smith, Chicago, IL (US)

( * ) Notice: Subject to any disclaimer, the term of this patent is extended or adjusted under 35 U.S.C. 154(b) by 0 days.

(21) Appl. No.: 18/821,418

(22) Filed: Aug. 30, 2024

(65) Prior Publication Data

US 2025/0075542 A1 Mar. 6, 2025

Related U.S. Application Data

(60) Provisional application No. 63/580,205, filed on Sep. 1, 2023.

(51) Int. Cl.
*E05C 17/50* (2006.01)
*E05C 7/00* (2006.01)

(52) U.S. Cl.
CPC ........ *E05C 17/50* (2013.01); *E05C 2007/007* (2013.01)

(58) Field of Classification Search
CPC ............. E05B 65/0864; E05B 65/0888; E05B 65/0841; E05B 65/0876; E05B 65/0882; E05C 17/50; E05C 17/60; E05C 17/443; E05C 17/54; E05C 2007/007; E05D 13/04; E05D 13/06
See application file for complete search history.

(56) References Cited

U.S. PATENT DOCUMENTS 330,591 A * 11/1885 Lang ......................... E05B 5/00 292/156
359,086 A * 3/1887 Matteson ................ E05D 13/04 16/194
915,593 A * 3/1909 Greeno ............... E05B 65/0864 292/210
1,395,910 A * 11/1921 Dennis .................... E05D 13/06 292/305
1,468,367 A * 9/1923 Lance ...................... E05D 13/06 292/5
1,620,705 A * 3/1927 Waitch .................... E05D 13/06 292/202
1,733,420 A * 10/1929 Maska .................... E05D 13/06 292/228
1,815,422 A * 7/1931 Songey ............... E05B 65/0864 292/60
1,960,509 A * 5/1934 Rateike ................... E05D 13/06 292/210
2,003,128 A * 5/1935 Vazquez ................. E05D 13/06 292/3
2,003,246 A * 5/1935 Carr ........................ E05D 13/06 292/228
2,018,281 A * 10/1935 Roberts ................... E05D 13/06 292/DIG. 47

(Continued)

FOREIGN PATENT DOCUMENTS

GB 736271 A * 9/1955 ............ E05D 13/06

*Primary Examiner* — Christine M Mills
*Assistant Examiner* — Faria F Ahmad
(74) *Attorney, Agent, or Firm* — Foley & Lardner LLP

(57) ABSTRACT

A window latch member for a window with a first sash and a second sash includes a body having an elongate shape with two ends. The first end includes multiple first openings configured to couple with a window catch. The second end includes multiple second openings configured to couple with a sash lock. The window latch member is retrofit to a window assembly.

16 Claims, 16 Drawing Sheets

(56) References Cited

U.S. PATENT DOCUMENTS

| | | | | | |
|---|---|---|---|---|---|
| 2,117,072 | A * | 5/1938 | Woods | E05D 13/06 | 292/288 |
| 2,130,465 | A * | 9/1938 | Kelly | E05D 13/06 | 292/228 |
| 2,226,346 | A * | 12/1940 | Mussman | E05D 13/06 | 292/205 |
| 2,446,144 | A * | 7/1948 | Story | E05D 13/06 | 292/175 |
| 2,481,329 | A * | 9/1949 | Monat | E05D 13/06 | 292/DIG. 20 |
| 2,501,586 | A * | 3/1950 | Sciacca | E05D 13/06 | 49/420 |
| 2,657,086 | A * | 10/1953 | Sweet | E05D 13/06 | 292/DIG. 20 |
| 2,673,754 | A * | 3/1954 | Jaksch | E05F 7/04 | 49/420 |
| 2,676,826 | A * | 4/1954 | Smith | E05D 13/06 | 292/DIG. 20 |
| 2,715,248 | A * | 8/1955 | Skarke | E06B 3/44 | 49/316 |
| 2,718,422 | A * | 9/1955 | Peoples, Sr. | E05D 13/06 | 292/DIG. 20 |
| 2,720,393 | A * | 10/1955 | Valeutine | E05F 11/42 | 74/528 |
| 2,724,609 | A * | 11/1955 | Donnelly | E05C 17/30 | 292/266 |
| 2,755,519 | A * | 7/1956 | Wilmer | E05D 13/06 | 292/DIG. 20 |
| 2,768,850 | A * | 10/1956 | Minnis, Jr. | E05B 65/0852 | 292/338 |
| 2,970,855 | A * | 2/1961 | Fisher | E05D 13/06 | 292/DIG. 20 |
| 2,982,575 | A * | 5/1961 | Pascual | E05D 13/06 | 292/274 |
| 3,085,300 | A * | 4/1963 | Carlston | E05D 13/04 | 292/169.14 |
| 3,129,470 | A * | 4/1964 | Schneider | E05D 13/06 | 49/63 |
| 3,280,511 | A * | 10/1966 | Johnson | E05D 13/06 | 49/446 |
| 3,288,509 | A * | 11/1966 | Galena | E05D 13/06 | 292/238 |
| 3,347,585 | A * | 10/1967 | Chmura | E05B 65/0888 | 292/288 |
| 4,227,725 | A * | 10/1980 | Lindquist | E05D 13/04 | 292/202 |
| 4,639,022 | A * | 1/1987 | Dunphy | E05B 65/0864 | 70/462 |
| 5,125,699 | A * | 6/1992 | Dinan | E05B 65/0894 | 292/288 |
| 5,325,685 | A * | 7/1994 | Frank | E05C 19/182 | 292/296 |
| 9,518,412 | B2 * | 12/2016 | Moroz | E05C 19/003 | |
| 10,920,468 | B2 | 2/2021 | Smith | | |
| 11,454,055 | B2 * | 9/2022 | Van Essen | E05C 17/02 | |
| 2004/0168370 | A1 * | 9/2004 | Pettit | E05C 9/00 | 49/185 |
| 2005/0016067 | A1 * | 1/2005 | Pettit | E05C 9/041 | 49/185 |
| 2006/0225362 | A1 * | 10/2006 | Pettit | E05C 1/10 | 49/184 |
| 2008/0169658 | A1 * | 7/2008 | Wolf | E05B 15/0205 | 292/241 |
| 2008/0222958 | A1 * | 9/2008 | De La Cruz | E05D 13/006 | 49/181 |
| 2011/0127779 | A1 * | 6/2011 | Kim | E05B 65/0882 | 292/173 |
| 2013/0180296 | A1 * | 7/2013 | McEachern | E05B 65/08 | 292/300 |
| 2013/0283695 | A1 * | 10/2013 | Hollermann | E05C 3/046 | 49/506 |
| 2014/0373464 | A1 * | 12/2014 | Benevenga | E06B 3/44 | 49/449 |
| 2016/0123048 | A1 * | 5/2016 | Sofianek | E05C 1/10 | 49/183 |

* cited by examiner

WINDOW LATCH

CROSS REFERENCE TO RELATED PATENT APPLICATION

The present application claims the benefit of and priority to U.S. Provisional Application No. 63/580,205, filed Sep. 1, 2023, the entire disclosure of which is incorporated by reference herein in its entirety.

BACKGROUND

Windows can have two operable sashes that translate (e.g., up and down, or side to side, etc.) along a window frame. More specifically, windows may include a sash lock, to secure the window sash in place, on one sash, and a window catch, to hold the window in a partially open or closed position, on the other sash. Users can latch the window by coupling the sash lock and the window catch.

SUMMARY

One implementation of the present disclosure is a window latch member for a window, according to some embodiments. In some embodiments, the window latch member includes a body. In some embodiments, the body has an elongated shape defining a first end and a second end. In some embodiments, the first end includes multiple first openings disposed along a first length of the body. In some embodiments, each opening of the first openings is configured to couple with a window catch of the window. In some embodiments, the second end includes multiple second openings disposed along a second length of the body. In some embodiments, each of the second openings is configured to couple with a sash lock of the window. In some embodiments, the body is retrofit to the window. In some embodiments, the window has a first sash and a second sash. In some embodiments, the first sash includes the window catch and the second sash includes the sash lock.

In some embodiments, the second sash is repositionable between a fully open position and a fully closed position. In some embodiments, the second openings are configured to provide coupling points for the sash lock to couple the second sash with the body such that the second sash is maintained at an intermediate position between the fully open position and the fully closed position.

In some embodiments, when the second sash is in the fully open position, an opening is defined between a bottom of the second sash and a lower window sill of the window. In some embodiments, a distance of the opening between the bottom of the second sash and the lower window sill has a maximum allowable value. In some embodiments, when the second sash is in the intermediate position and the sash lock is coupled with a corresponding one of the second openings, the distance of opening between the bottom of the second sash is less than the maximum allowable value and is substantially equal to a height of an air conditioning unit.

In some embodiments, the second openings are spaced to define multiple different intermediate positions. In some embodiments, at least two of the multiple different intermediate positions result in different values of the distance configured to accommodate different sized air conditioning units.

In some embodiments, the first sash is repositionable between a fully open position and a fully closed position. In some embodiments, the first openings are configured to provide multiple coupling points for the window catch to couple the first sash with the body such that the first sash is maintained at a position between the fully open position and the fully closed position.

In some embodiments, each of the second openings include a protrusion extending from an edge of the second opening. In some embodiments, the protrusion is configured to couple with the sash lock. In some embodiments, the protrusion is offset from a centerline of the second opening. In some embodiments, the protrusion extends perpendicularly from a first edge. In some embodiments, each of the first openings includes a curved member extending along a width of the first opening. In some embodiments, the curved member is configured to couple with the window catch.

Another implementation of the present disclosure is a window assembly, according to some embodiments. In some embodiments, the window assembly includes a first sash and a second sash. In some embodiments, the first sash includes a window catch and the second sash includes a sash lock. In some embodiments, the window assembly includes a window latch member having a body that has an elongated shape. In some embodiments, the body defines a first end and a second end. In some embodiments, the first end includes multiple first openings disposed along a first length of the body. In some embodiments, each opening of the first openings is configured to couple with the window catch. In some embodiments, the second end includes multiple second openings disposed along a second length of the body. In some embodiments, each of the second openings is configured to couple with the sash lock.

In some embodiments, the second sash is repositionable between a fully open position and a fully closed position. In some embodiments, the second openings are configured to provide multiple coupling points for the sash lock to couple the second sash with the body such that the second sash is maintained at an intermediate position between the fully open position and the fully closed position.

In some embodiments, when the second sash is in the fully open position, an opening is defined between a bottom of the second sash and a lower window sill of the window, a distance of the opening between the bottom of the second sash and the lower window sill having a maximum allowable value. In some embodiments, when the second sash is in the intermediate position and the sash lock is coupled with a corresponding one of the second openings, the distance of the opening between the bottom of the second sash is less than the maximum allowable value and is substantially equal to a height of an air conditioning unit.

In some embodiments, the second openings are spaced to define multiple different intermediate positions. In some embodiments, at least two of the multiple different intermediate positions result in different values of the distance configured to accommodate different sized air conditioning units.

In some embodiments, the first sash is repositionable between a fully open position and a fully closed position. In some embodiments, the multiple first openings are configured to provide multiple coupling points for the window catch to couple the first sash with the body such that the first sash is maintained at a position between the fully open position and the fully closed position.

In some embodiments, each of the second openings includes a protrusion extending from an edge of the second opening. In some embodiments, the protrusion is configured to couple with the sash lock. In some embodiments, the protrusion is offset from a centerline of the second opening. In some embodiments, the protrusion extends perpendicularly from a first edge. In some embodiments, each of the first openings includes a curved member extending along a width of the first opening. In some embodiments, the curved member is configured to couple with the window catch.

Another implementation of the present disclosure is a method for installing a window latch member on a window assembly, according to some embodiments. In some embodiments, the window assembly includes a first sash and a second sash. In some embodiments, the method includes removing an upper window rail of the second sash from a window frame. In some embodiments, the method includes installing a window catch on the first sash with a first opening disposed on a length of a body of the window latch member. In some embodiments, the method includes installing the upper window rail of the second sash to the window frame. In some embodiments, the method includes translating the first sash and the second sash along the window frame to a desired position for latching. In some embodiments, the method includes coupling a sash lock on the second sash with a second opening disposed on the length of the body of the window latch member.

In some embodiments, the first opening is one of multiple first openings disposed along the length of the body. In some embodiments, the second opening is one of multiple second openings disposed along the length of the body. In some embodiments, each of the first openings includes a curved member extending along a width of the first opening. In some embodiments, the curved member is configured to couple with the window catch.

In some embodiments, each of the second openings includes a protrusion extending from an edge of the second opening. In some embodiments, the protrusion is configured to couple with the sash lock.

This summary is illustrative only and is not intended to be in any way limiting. Other aspects, inventive features, and advantages of the apparatuses or processes described herein will become apparent in the detailed description set forth herein, taken in conjunction with the accompanying figures.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a window latch has the form of an elongated member. The window latch includes a body that defines multiple first coupling points along a first portion at a first end of the window latch. The body also defines multiple second coupling points along a second portion at a second end of the window latch. The first coupling points have geometry (e.g., an opening and a protrusion) such that the first coupling points are configured to couple the window latch with a window catch of a window assembly (e.g., double-hung windows, sliding windows, etc.). The second coupling points include geometry such that the second coupling points are configured to couple the window latch with a window catch of a window assembly. The first coupling points may each include a curved member extending along a width of the opening, and partially outward from the body of the window latch. The curved member may have geometry corresponding to a sash lock member and is configured to couple with the window catch. Each of the second coupling points may include a protrusion extending from an edge of the opening. The protrusion may extend downwards from a top surface of an opening. The protrusion is configured to couple with a sash lock of the window assembly.

These coupling points, when coupled to the window assembly (e.g., at the sash lock and the window catch), provide multiple coupling points for the window assembly to be held between a fully open and a fully closed position. Various window positions may be desired to provide ventilation, or to control air flow. Advantageously, the coupling points are disposed in an array along the first portion and the second portion of the body such that the window assembly may be maintained in a partially opened or partially closed position. These coupling points serve to maintain a position of the window between the fully open and fully closed position and provide an additional barrier between an interior and an exterior side of the window assembly.

Figure 1:
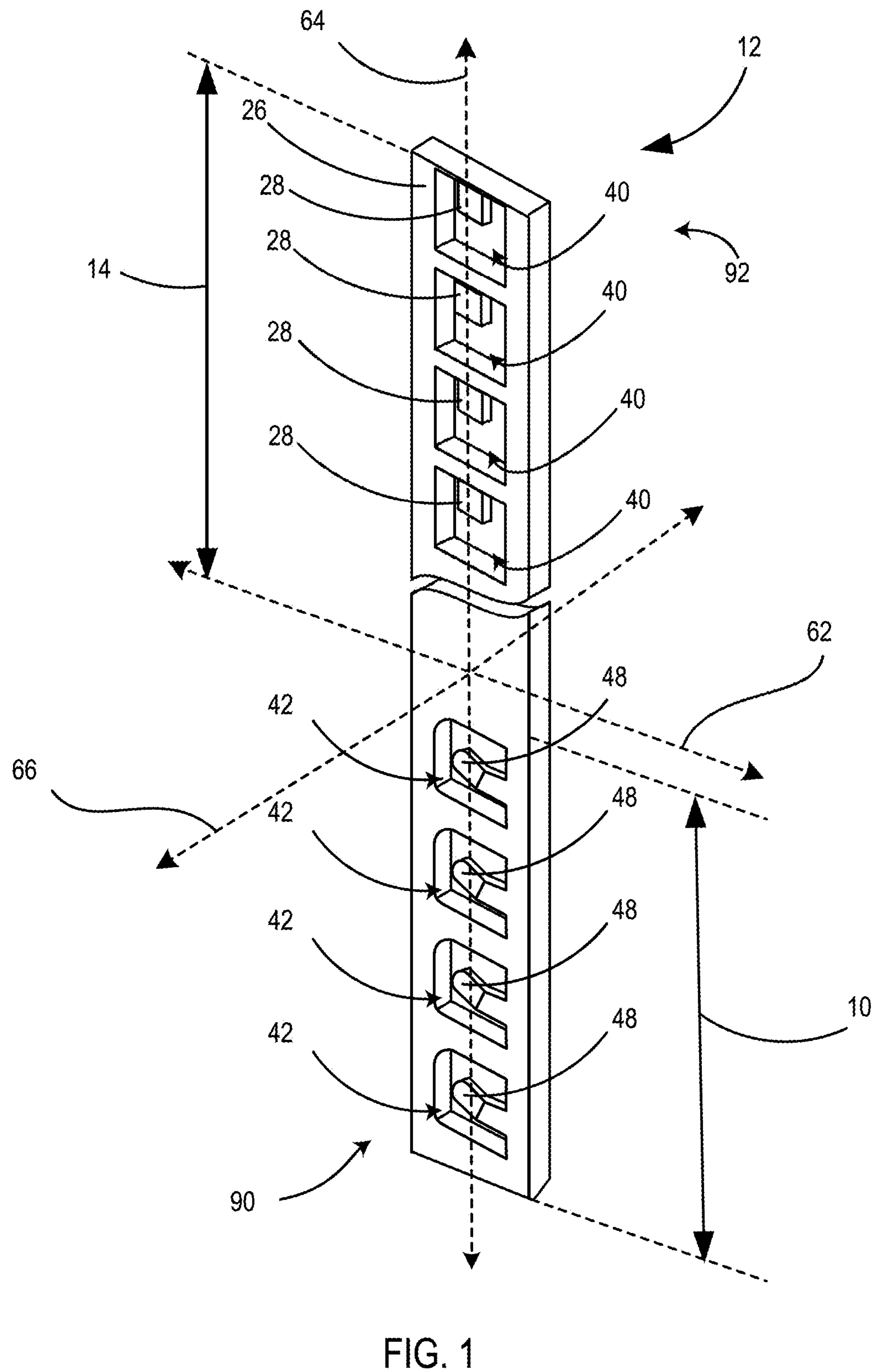
FIG. 1 is a perspective view of a window latch, according to some embodiments.

Referring to FIG. 1, a window latch 12 (e.g., a locking member, an intermediate window member, a window repositioner, etc.) includes a body 26 (e.g., a main portion, an elongated member, etc.) having an elongated shape. The window latch 12 includes or defines first openings 42 (e.g., first holes, first apertures, etc.) disposed in a longitudinal direction 64 of the body 26. In some embodiments, the first openings 42 may include any number of openings (e.g., two, three, four, five, six, seven, eight, nine, 10, 20, etc.) The first openings 42 may be uniformly spaced in the longitudinal direction 64. The first openings 42 are disposed along a first length 10 (e.g., first side, first leg, first portion, first segment, etc.) of the body 26 proximate a first end 90 (e.g., a proximate end, a fore end). The window latch 12 also includes second openings 40 (e.g., second holes, second apertures, etc.) disposed along the longitudinal direction 64 of the body 26. In some embodiments, the second openings 40 may include any number of openings (e.g., two, three, four, five, six, seven, eight, nine, 10, 20, etc.) The second openings 40 are positioned along a second length 14 (e.g., second side, second leg, second portion, second segment, etc.) of the body 26 proximate a second end 92 (e.g., a distal end, an aft end, etc.) of the body 26.

The body 26 is manufactured from a rigid material (e.g., steel, aluminum, brass, plastic, etc.) that provides sufficient strength and stability to support a window sash. The first openings 42 and the second openings 40 can be spaced apart in a variety of ways such as uniformly, non-uniformly, at desired intervals, etc., to meet requirements of a user or owner of a window assembly. In some embodiments, the body 26 is provided in different finishes (e.g., polished, brushed, matte, etc.) to match overall décor or to match other window hardware provided with the window assembly. Each of the first openings 42 includes a curved member 48 (e.g., hook, arcuate member, a cantilevered member, an elongated member, a laterally extending member, a bend, etc.) that extends in a lateral direction 62 of the body 26 along a lateral width of the second openings 40. The curved member 48 also extends at least partially in an outward direction 66 from the body 26. The curved member 48 may have a fixed end that is fixed or integrally formed with a vertical side of the first opening 42, and a free end opposite the fixed end. The curved member 48 of each of the first openings 42 is configured to be received within and interlock with a window catch of a window assembly to couple the body 26 with the window catch at a selected one of the first openings 42. When the curved member 48 is received and interlocked with the window latch, it secures the window assembly in a partially opened or closed position. The curved member 48 may have a thickness such that the curved member 48 is configured to elastically deform. In this way, the curved member 48 may be a bendable or deformable member such that the curved member 48 can be received within and extend around a portion of the window catch to couple the window latch 12 with the window catch. In some embodiments, the curved member 48 may include an elastic component.

Each of the second openings 40 includes a protrusion 28 (e.g., wire, bar, length, an extension, an interfacing member, etc.) extending from an upper edge of the second opening 40. The protrusion 28 extends from the upper edge of the second opening 40 in the longitudinal direction 64. In some embodiments, the protrusion 28 does not extend in the outward direction 66 from the body 26 of the window latch 12. For example, the protrusion 28 may be substantially co-planar with a face of the body 26. In some embodiments, the protrusion 28 is perpendicular to the upper edge of the opening. The protrusion 28 may similarly have a free end opposite an end from which the protrusion 28 extends from the upper edge of the second opening 40.

Figure 2:
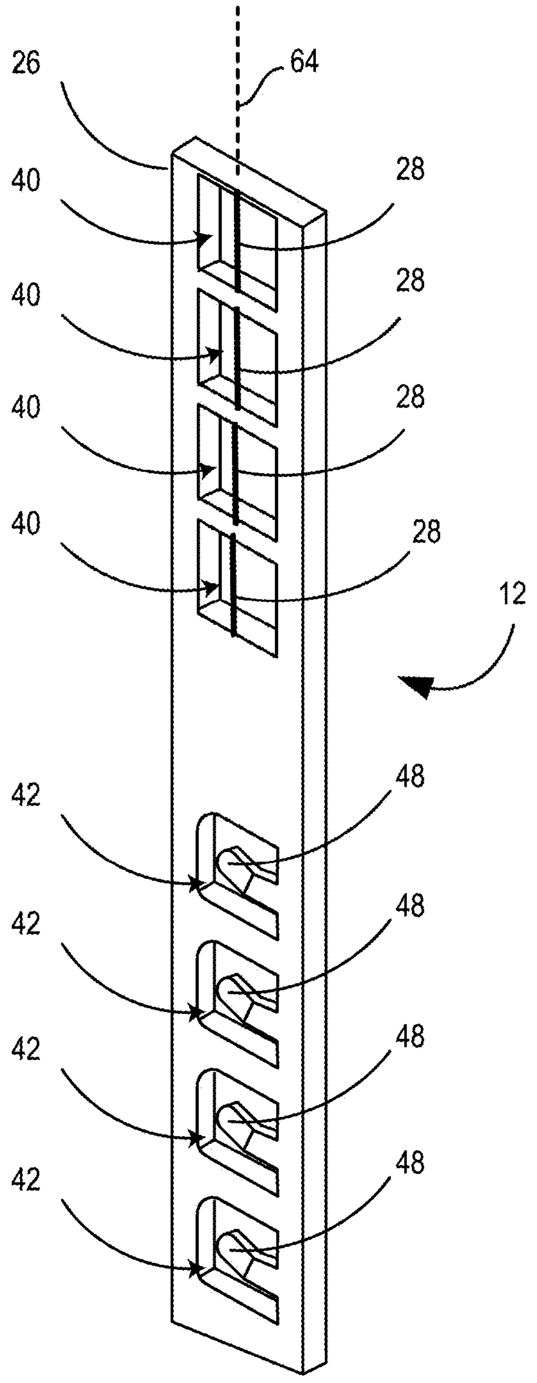
FIG. 2 is a perspective view of a window latch, according to some embodiments.
Figure 3:
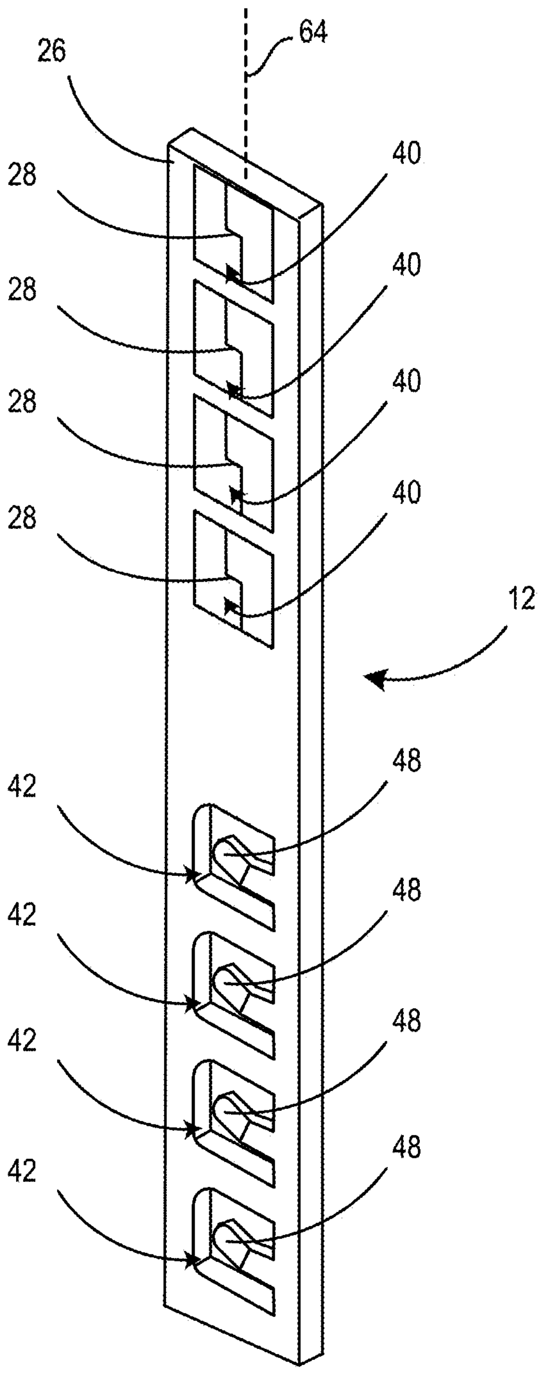
FIG. 3 is a perspective view of a window latch, according to some embodiments.

Referring to FIGS. 1-3, the protrusion 28 may be provided according to different forms. Referring to FIG. 1, the protrusion 28 may have the form of a discrete member that extends from the upper edge or surface of the second openings 40 and is positioned centrally on the second opening 40 (e.g., in the lateral direction 62). The protrusion 68 may extend along the longitudinal direction 64 a distance less than an overall height of the second opening 40 along the longitudinal direction 64. In some embodiments, the protrusion 68 has a length in the longitudinal direction 64 that is less than half a length of the second opening 40 along the longitudinal direction 64. The protrusion 68 may, in some embodiments, extend along the longitudinal direction 64 substantially an entire longitudinal length of the second opening 40 (e.g., the second opening 40 may be provided as two openings spaced apart in the lateral direction 62 and the portion of the body 26 between the two openings may function as the protrusion 68).

Referring to FIG. 2, the protrusion 28 may be provided as an elongated member that extends an entire longitudinal length of the second opening 40. For example, the protrusion 28 may be provided as a wire, a beam, a bar, a bolt, a cylindrical member or pin, a spoke, etc. Referring to FIG. 3, the protrusion 28 may be provided as a bent wire, a coil, a hook, or a stepped surface. Additionally, different embodiments may have protrusions 28 of varying lengths. In some embodiments, the protrusion 28 may extend in the longitudinal direction 64 to a center point of the second opening 40. In other embodiments, the protrusion 28 may extend across an entire longitudinal length of the second opening 40 to a second or lower edge of the second opening 40. Depending on the size and shape of the protrusion 28, the second openings 40 may resemble different shapes and sizes in order to accommodate the geometry of the protrusion 28.

Figure 4:
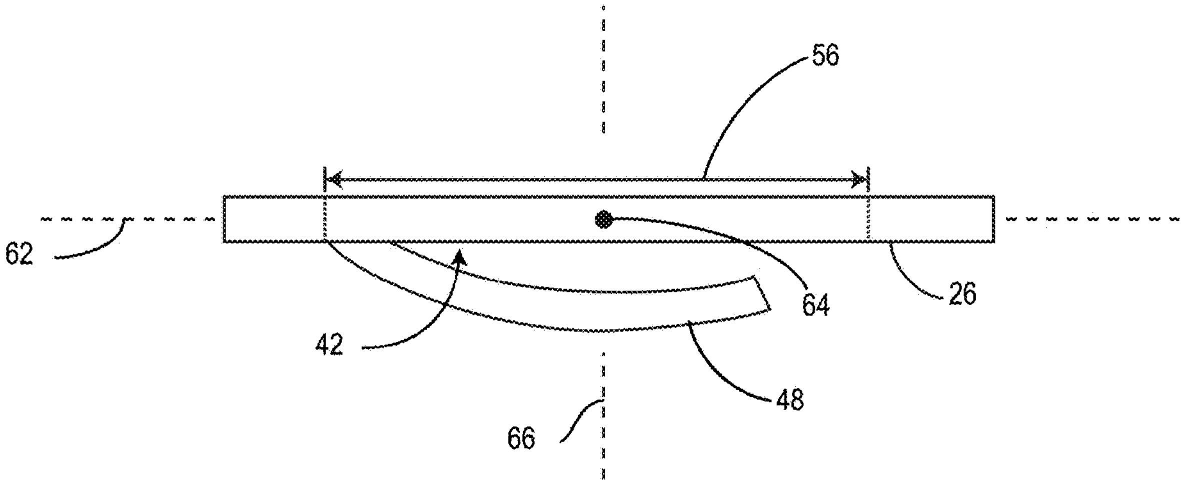
FIG. 4 is a top view of one side of a portion of the window latch of FIGS. 1-3, according to some embodiments.

Referring to FIG. 4, the curved member 48 extends across at least a portion of a lateral width 56 of the first opening 42. The curved member 48 extends in the lateral direction 62 across the first opening 42 and extends at least partially in the outward direction 66 from the body 26 of the window latch 12. In particular, the curved member 48 extends at least partially from a face of the body 26. In some embodiments, the curved member 48 has one end fixed to an edge of the first opening 31, and a free end such that the curved member 48 has the form of a curved cantilever beam that extends in the lateral direction 62. The curved member 48 may be deformable such that the curved member 48 can be wrapped around a window catch or a sash lock catch during installation. In some embodiments, the curved member 48 has both ends fixed to opposite edges of the first opening 42. In different embodiments, the curved member 48 extends in the outward direction 66 in varying amounts (e.g., various angles, etc.). Depending on the size and shape of the curved member 48, the first openings 42 may have different shapes and/or sizes to accommodate the curved member 48.

Figure 5:
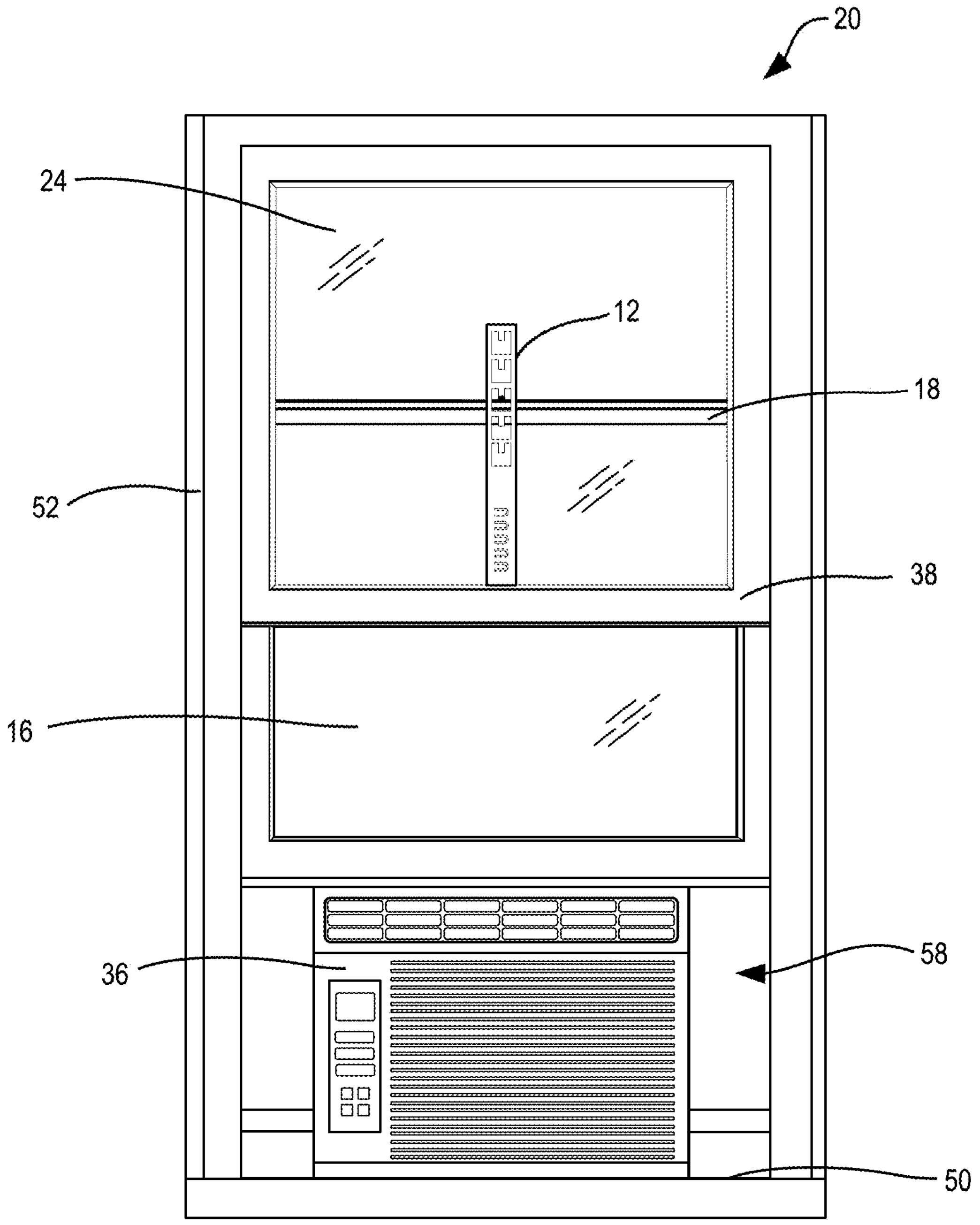
FIG. 5 is a rear view of a window assembly including the window latch of any of FIGS. 1-3, according to some embodiments.
Figure 6:
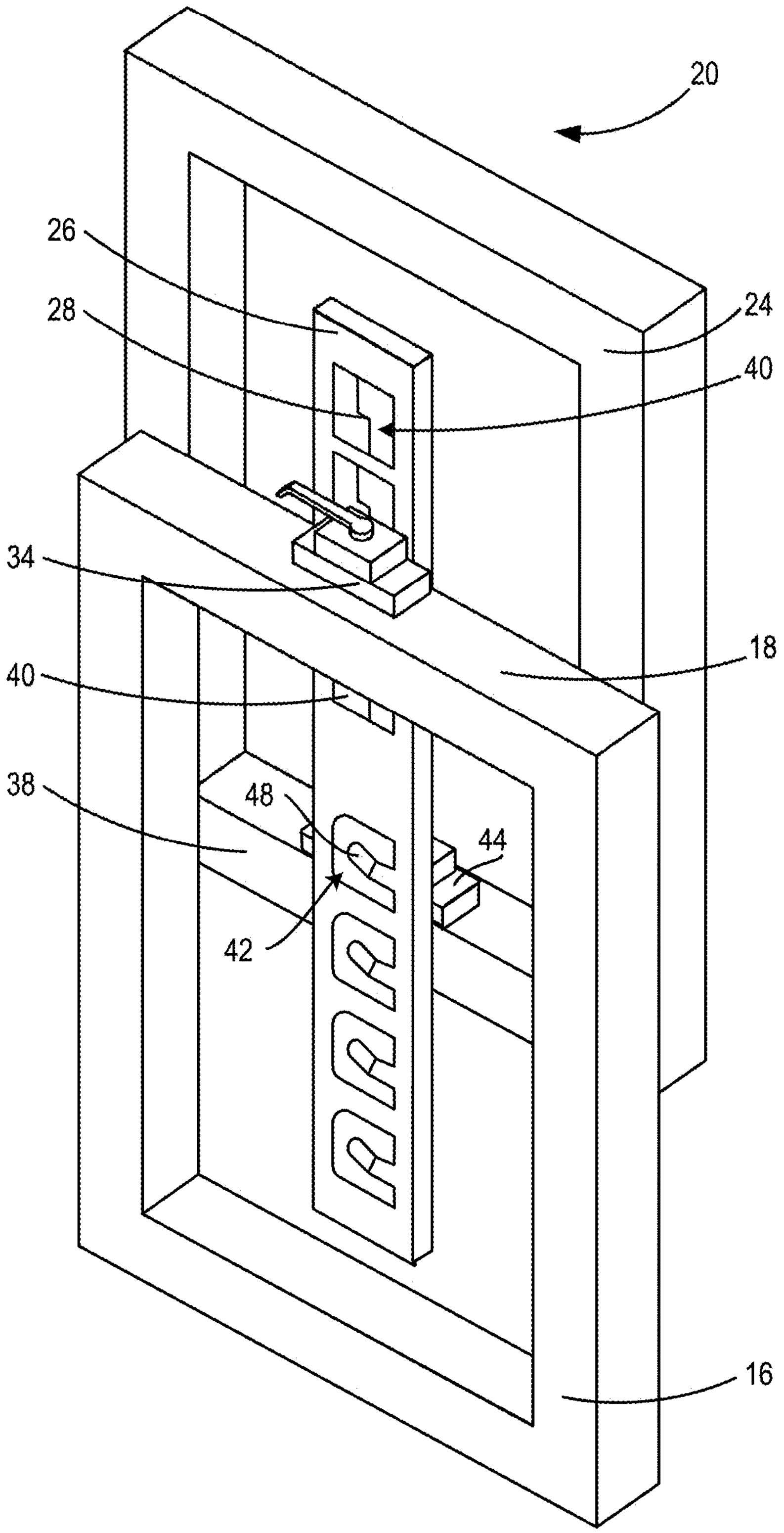
FIG. 6 is a perspective view of a window assembly including the window latch of any of FIGS. 1-3, according to some embodiments.
Figure 7:
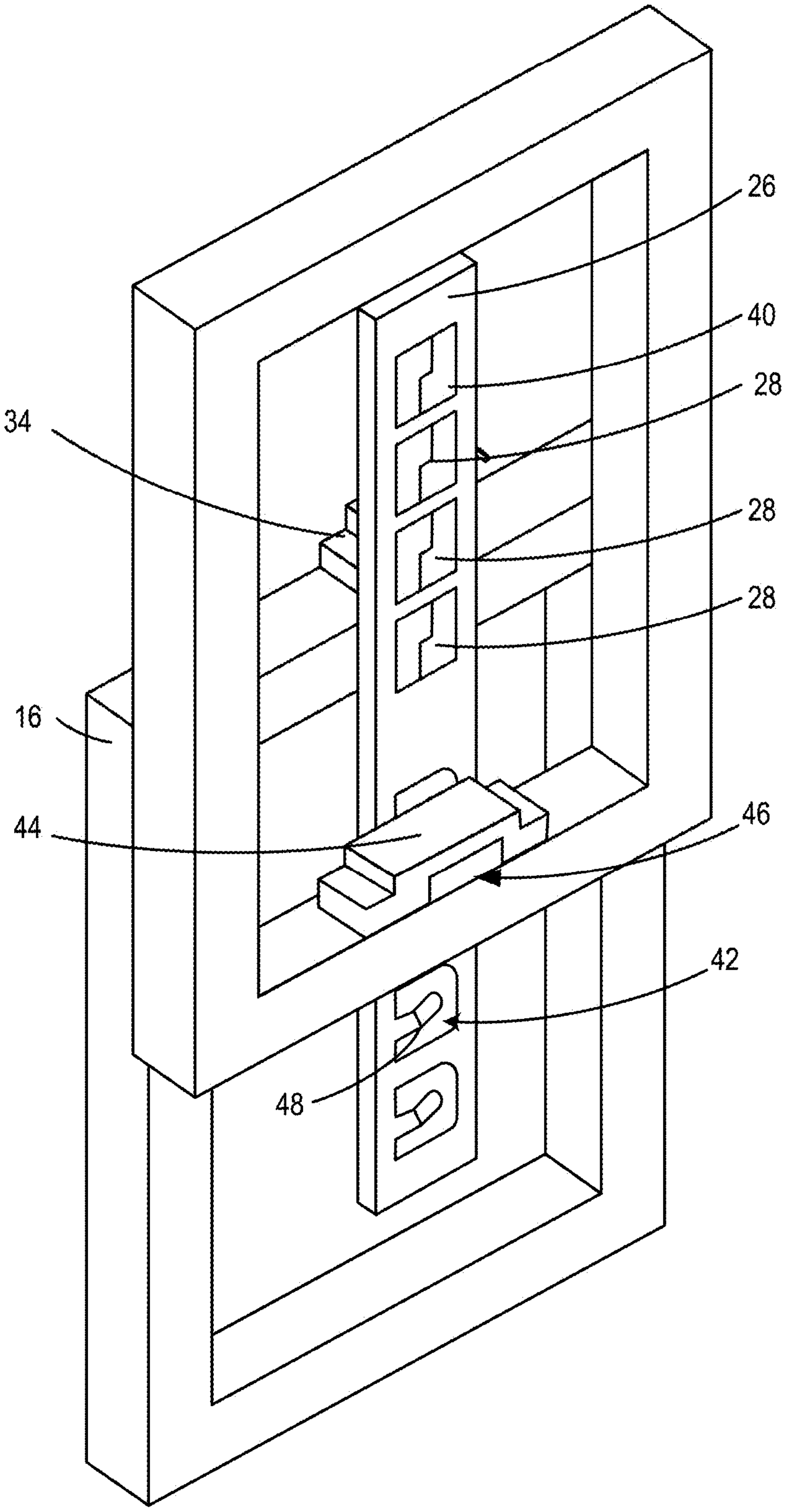
FIG. 7 is a perspective view of the back side of the window assembly of FIG. 6, according to some embodiments.

Referring to FIGS. 5-7, the window latch 12 is configured to couple with a window assembly 20 (e.g., a double-hung window, a sliding window, a casement window, awning window, hopper window, etc.), including a first sash 24 (e.g., a first frame, a first window, a first window pane assembly, a movable window, etc.) and a second sash 16 (e.g., a second frame, a second window, a second window pane assembly, a stationary or second movable window, etc.). The first sash 24 and the second sash 16 hold glass panes. In some embodiments, the first sash 24 and the second sash 16 slide vertically, and can be moved up and down independent of one another. In some embodiments, the first sash 24 and the second sash 16 slide horizontally. The first sash 24 includes a window catch 44 (e.g., a female locking member, a receiving member, a catch slot, a receiving plate, etc.) and the second sash 16 includes a sash lock 34 (e.g., a hooking mechanism, a locking mechanism, latching mechanism, etc.). When the first sash 24 and the second sash 16 are positioned such that the window catch 44 and the sash lock 34 are aligned, the sash lock 34 may be operated to engage, interlock, or couple a portion of the sash lock 34 with the window catch 44. In some embodiments, the sash lock 34 may interlock with the window catch 44 to secure the window assembly 20 closed. In some embodiments, the sash lock 34 may interlock with the window catch 44 to provide security and protect against unauthorized access.

The window catch 44 is positioned on a bottom rail 38 (e.g., bottom side, bottom length, bottom frame, etc.) of the first sash 24. The sash lock 34 is positioned on a top rail 18 (e.g., top side, top length, top frame, etc.) of the second sash 16. The sash lock 34 is aligned such that when the sashes (e.g., the first sash 24 and the second sash 16) are in a certain position, the window catch 44 and the sash lock 34 are capable of interlocking with each other to couple the first sash 24 and second sash 16 together (e.g., to limit relative movement, secure in place, etc.). The window catch 44 defines a window catch opening 46 (e.g., a hole, an inner volume, a space, aperture, a slot, etc.). The first sash 24 and the second sash 16 are located within a window frame 52 (e.g., enclosure, side rails, etc.) that allows the sashes to translate along a length of the window frame 52. The window frame 52 holds the window assembly 20 within a wall opening, and may comprise a top (e.g., head, etc.), bottom (e.g., sill), and sides (e.g., jambs, etc.). The first sash 24 and the second sash 16 may translatably couple with the window frame 52 via tracks.

Referring to FIGS. 5-7, the window latch 12 may facilitate interlocking or coupling the first sash 24 with the second sash 16 to limit relative movement between the first sash 24 and the second sash 16. The window latch 12 facilitates coupling the first sash 24 with the second sash 16 at an intermediate position. For example, when the first sash 24 and the second sash 16 are in a closed position (e.g., the second sash 16 is at a bottom of its stroke along the window frame 52), the sash lock 34 and the window catch 44 may be aligned. The window latch 12 facilitates allowing the first sash 24 and the second sash 16 to interlock or couple with each other at a position other than the closed position. The sash lock 34 is configured to interlock or couple with the second openings 40 or geometry at the second openings 40 and the curved members 48 of the first openings 42 are configured to be received within the window catch opening 46 to couple the first sash 24 and the second sash 16 with each other at an intermediate position (e.g., a partially open or a partially closed position).

Figure 8:
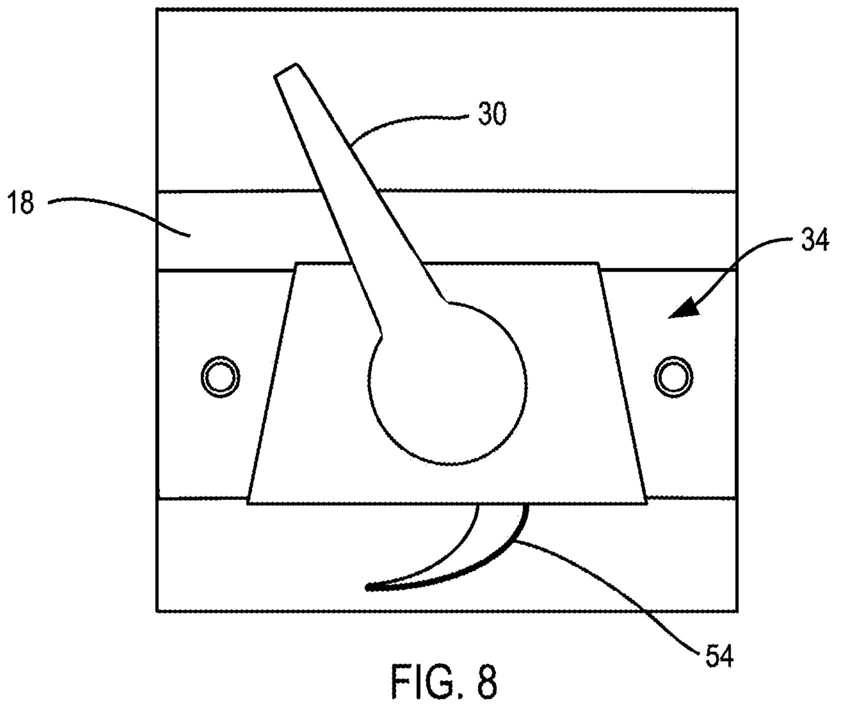
FIG. 8 is a top view of a sash lock of the window assembly of FIG. 6, according to some embodiments.
Figure 11:
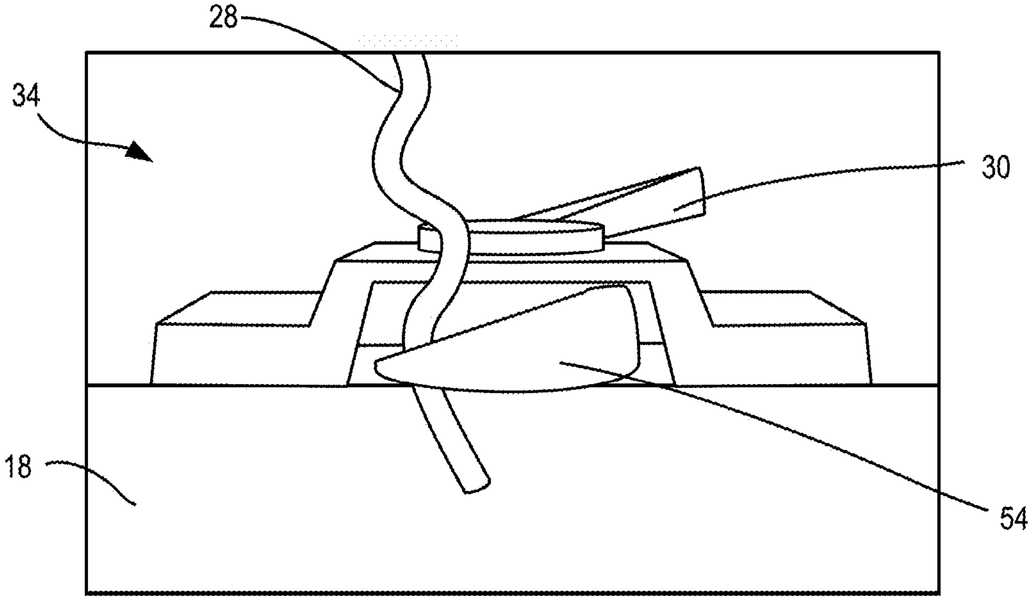
FIG. 11 is a view of the engagement of a window latch protrusion and a sash lock, according to some embodiments.
Figure 12:
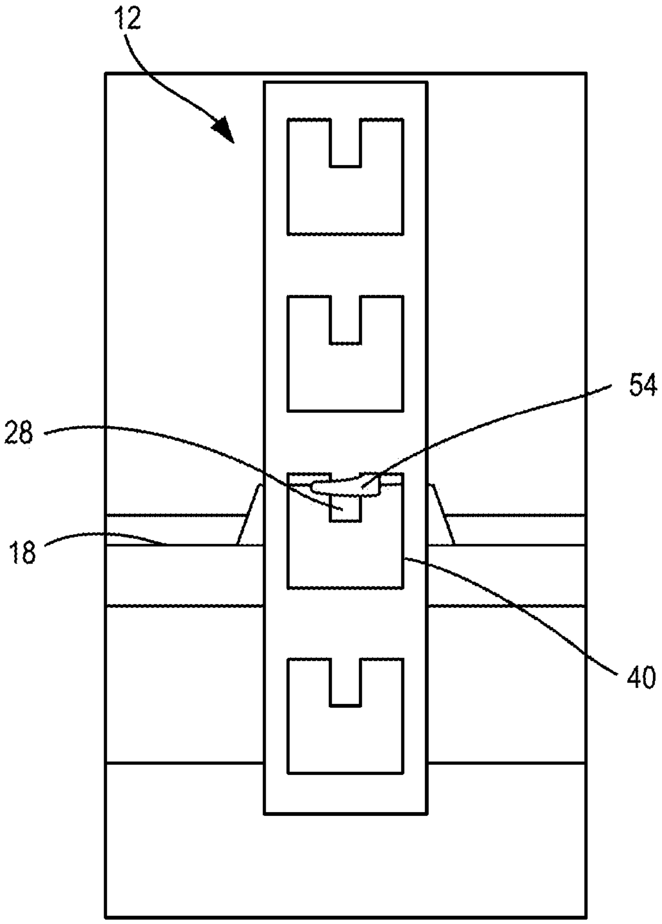
FIG. 12 is a view showing engagement between a portion of the window latch of FIG. 1 and a sash lock, according to some embodiments.

Referring to FIG. 8, the sash lock 34 includes an arm 30 (e.g., lever, switch, handle, knob, etc.) that when activated (e.g., turned, rotated, etc.), drives a sash lock hook 54 (e.g., curved member, latch, cam, locking mechanism, etc.). The sash lock hook 54 may be driven to rotate or move from a first position to a second position to hook, grab, engage, secure, or otherwise interlock with an adjacent member. For example, when the sash lock 34 is aligned with the window catch 44, the sash lock hook 54 may interlock with a portion of the sash lock 34. In some embodiments, a friction-based mechanism is further provided to engage the sash lock 34 with the window catch 44. Similarly, when the sash lock 34 is aligned with one of the second openings 40, the sash lock hook 54 may interlock with a corresponding portion of the window latch 12 at the second opening 40 (e.g., the protrusion 28). The protrusion 28 of the second opening 40 is configured to couple with the sash lock 34 to limit relative movement between the second sash 16 and the window latch 12. The protrusion 28 is configured such that when the sash lock hook 54 moves from the first position to the second position, the protrusion 28 is positioned between the sash lock hook 54 and the sash lock 34. (FIG. 11). The size and shape of the protrusion 28 may vary depending on the size of the sash lock hook 54. When the protrusion 28 is between the sash lock hook 54 and the sash lock 34, movement of the second sash 16 is restricted. As shown in FIG. 12, the sash lock hook 54 may engage or interlock with the protrusion 28 of the embodiment shown in FIG. 1.

Figure 9:
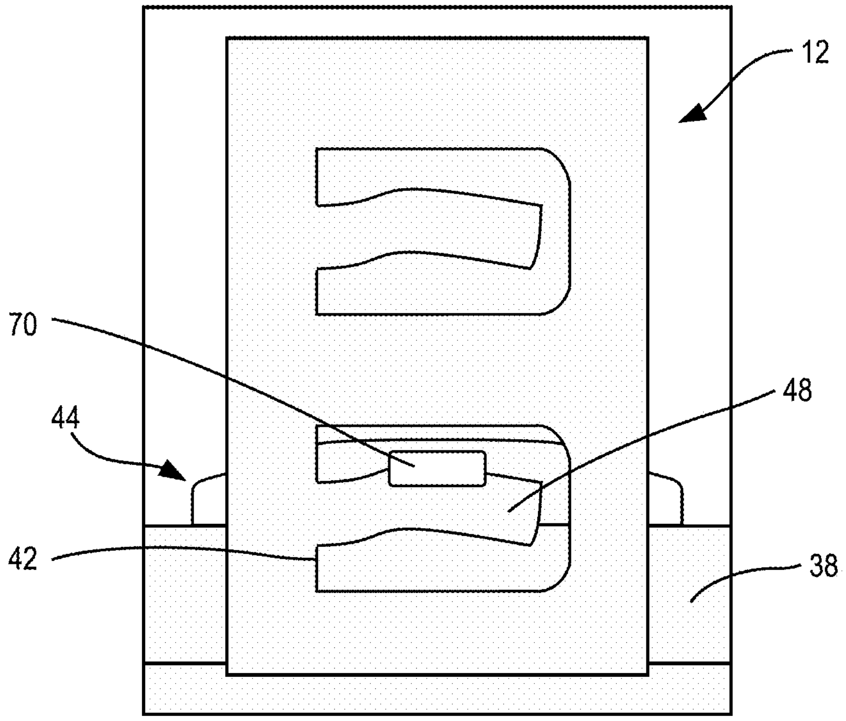
FIG. 9 is a close up perspective view of a portion of the window latch of FIGS. 1-3 engaging with a catch lock, according to some embodiments.
Figure 10:
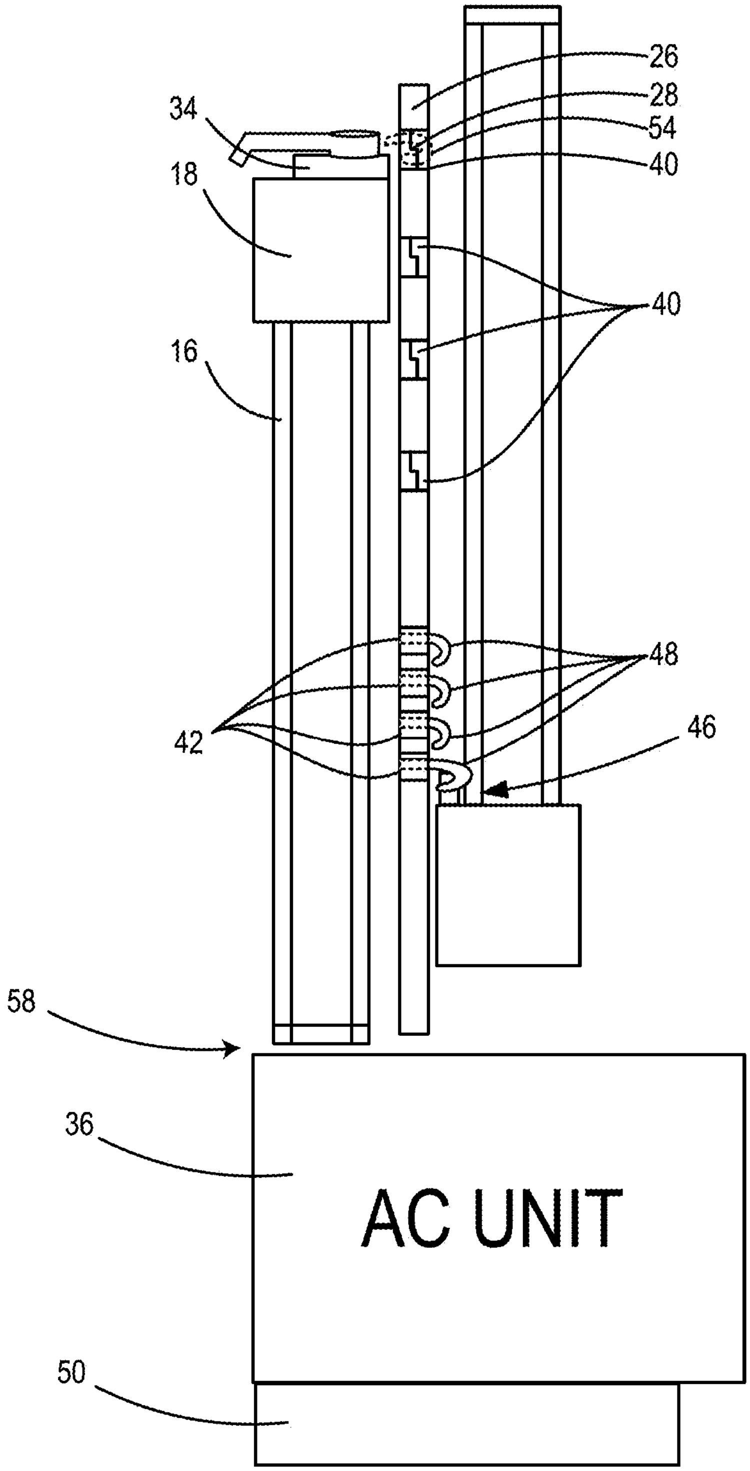
FIG. 10 is a side view of the window assembly of FIG. 6 with an air conditioner unit, according to some embodiments.

Referring to FIG. 9, the curved member 48 of the first opening 42 is configured to couple with the window catch 44. The curved member 48 may couple with the window catch 44 in multiple ways. In some embodiments, the window catch 44 includes a catch tab 70 (e.g., protrusion, extension, ledge, etc.) positioned above the window catch opening 46 extending outward from the window catch 44. The curved member 48 is configured to fit underneath the catch tab 70 in a way that when the window latch 12 is engaged, the curved member 48 limits movement of the first sash 24 relative to the window latch 12. In some embodiments, the curved member 48 may be deformed to secure the catch tab 70. In some embodiments, the curved member 48 is configured to reach behind the window catch 44 and enter the window catch opening 46. (FIG. 10). In some embodiments, the curved member 48 is configured to extend into the front of the window catch opening 46. These examples are in no way limiting, and the curved member 48 can be configured in multiple other ways to achieve coupling with the window catch 44 to thereby limit relative movement of the first sash 24 relative to the window latch 12.

Figure 13:
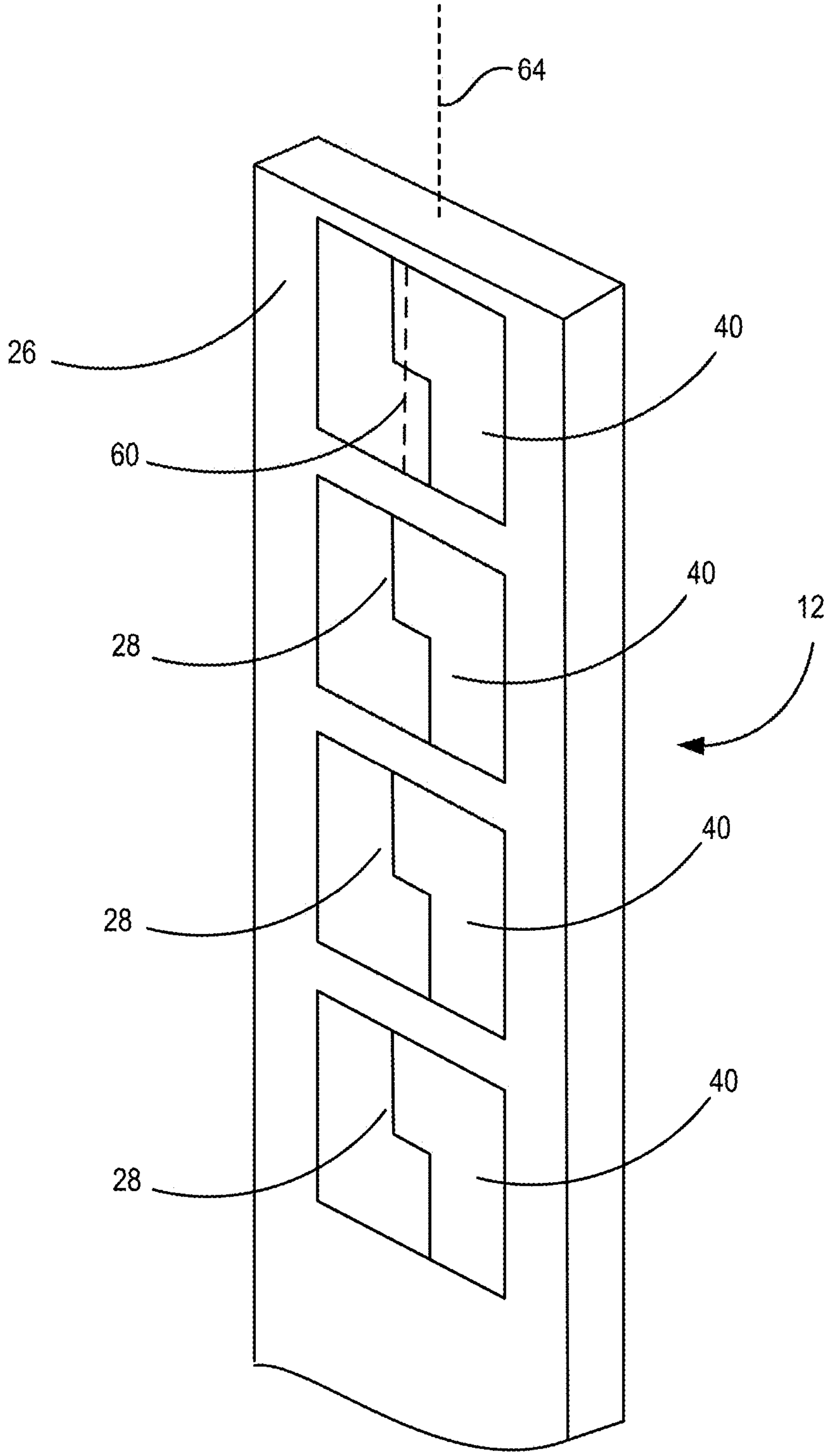
FIG. 13 is a perspective view of a portion of the window latch of FIG. 3, according to some embodiments.
Figure 14:
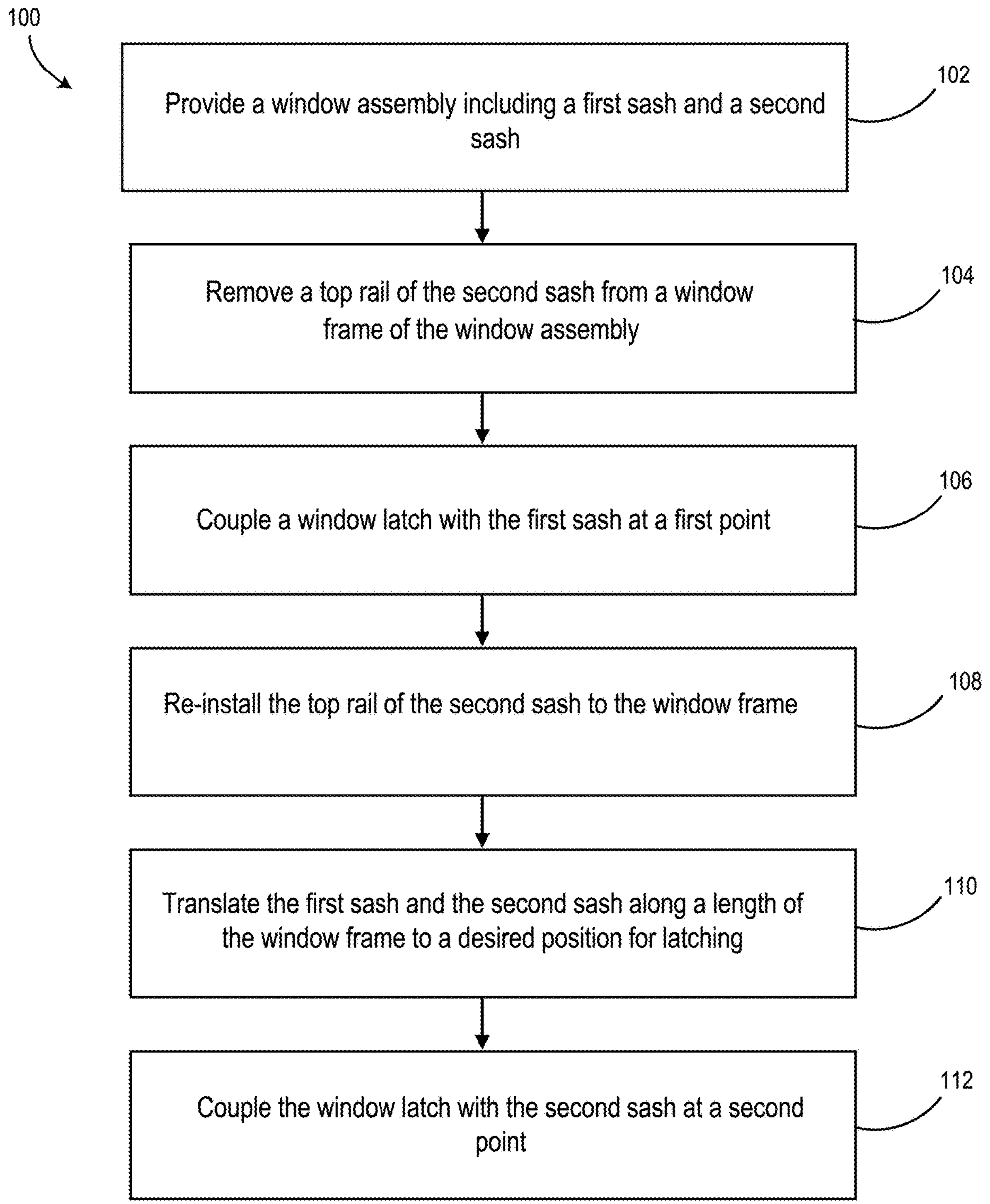
FIG. 14 is a flow diagram of a process for retrofitting and using a window latch on a window assembly, according to some embodiments.

Referring to FIG. 13, the protrusion 28 of the second opening 40 may be used for multiple sized sash locks 34 and sash lock hooks 54. For example, the protrusion 28 may be offset from a centerline 60 (e.g., middle, center, median, etc.) of the second opening 40. This may allow more room for the sash lock hook 54 to freely move between the first position and the second position and reduces the possibility of the protrusion 28 restricting the movement of the sash lock hook 54 as it moves from the first position to the second position.

Referring again to FIGS. 5-7, when the curved member 48 of the first opening 42 is coupled to the window catch 44, and the protrusion 28 of the second opening 40 is coupled to the sash lock 34, the window latch 12 may be considered as in an engaged (e.g., latched, coupled, active, secured, etc.) state with the window catch 44. Interlocking between the window catch 44 and the curved member 48 of the first openings 42 limits relative movement between the first sash 24 and the window latch 12, while interlocking between the sash lock 34 and the protrusion 28 of the second openings 40 limits relative movement between the second sash 16 and the window latch. When in the engaged state, the respective positions of the first sash 24 and the second sash 16 are maintained. The first openings 42 and the second openings 40 are disposed along the body 26 of the window latch 12 to provide multiple coupling or connection points for the window assembly 20. These coupling or connection points allow the first sash 24 and the second sash 16 to maintain multiple intermediate positions between a fully open position and a fully closed position. Therefore, the window latch 12 provides a user easy and convenient position control how far the window assembly 20 may be opened. Further, the window latch 12 may provide security by locking the window assembly 20 in place. When in the fully open position, the first sash 24 and the second sash 16 are each in their respective open position. When the second sash 16 is in the fully open position, an opening 58 (e.g., hole, gap, aperture, space, etc.) is defined between a bottom of the second sash 16 and a lower window sill 50, where a distance of the opening 58 between the bottom of the second sash 16 and the lower window sill 50 has a maximum allowable value.

Referring to FIGS. 5 and 10, the multiple intermediate positions at which the first sash 24 and the second sash 16 can be coupled are determined by the position of the first openings 42 and the second openings 40. In some embodiments, these intermediate positions define a lower window opening 58 that is approximately the same height as different sized air conditioning units 36 (e.g., window air conditioners, window units, etc.). For example, the spacing and positioning of the first openings 42 and the second openings 40 may be provided along the window latch 12 such that the resulting relative position of the first sash 24 and the second sash 16 results in the lower window opening 58 having heights (e.g., between the bottom of the second sash 16 and the lower window sill 50) corresponding to average heights of one or more air conditioning units (e.g., air conditioning unit 36). The air conditioning unit 36 can be positioned between the bottom of the second sash 16 and the lower window sill 50. Although the first openings 42 and the second openings 40 may be arranged to accommodate air conditioning units 36 of typical sizes and heights, the position of the openings are not limited to solely accommodating air conditioning units 36, and the lower window opening 58 can be used in multiple ways.

Referring to FIGS. 14 and 15A-15D, the window latch 12 may be retrofit (e.g., added, installed, modified, etc.) on a window assembly (e.g., window assembly 20), such as an existing window assembly, according to a process 100 (e.g., a method). The process 100 includes steps 102-112 and may be performed to install and configure the window latch 12 for retaining the first sash 24 and the second sash 16 at an intermediate position as desired by a user.

The process 100 includes providing a window assembly including a first sash and a second sash (step 102), according to some embodiments. In some embodiments, the window assembly is the window assembly 20 (e.g., FIG. 15A). The first sash (e.g., first sash 24) and the second sash (e.g., second sash 16) may be configured to move relative to each other (e.g., vertically, etc.) to open or close the window assembly. The first sash and the second sash can include a sash lock and a window catch for retaining the first sash and the second sash in a closed position relative to each other.

Figure 15A:
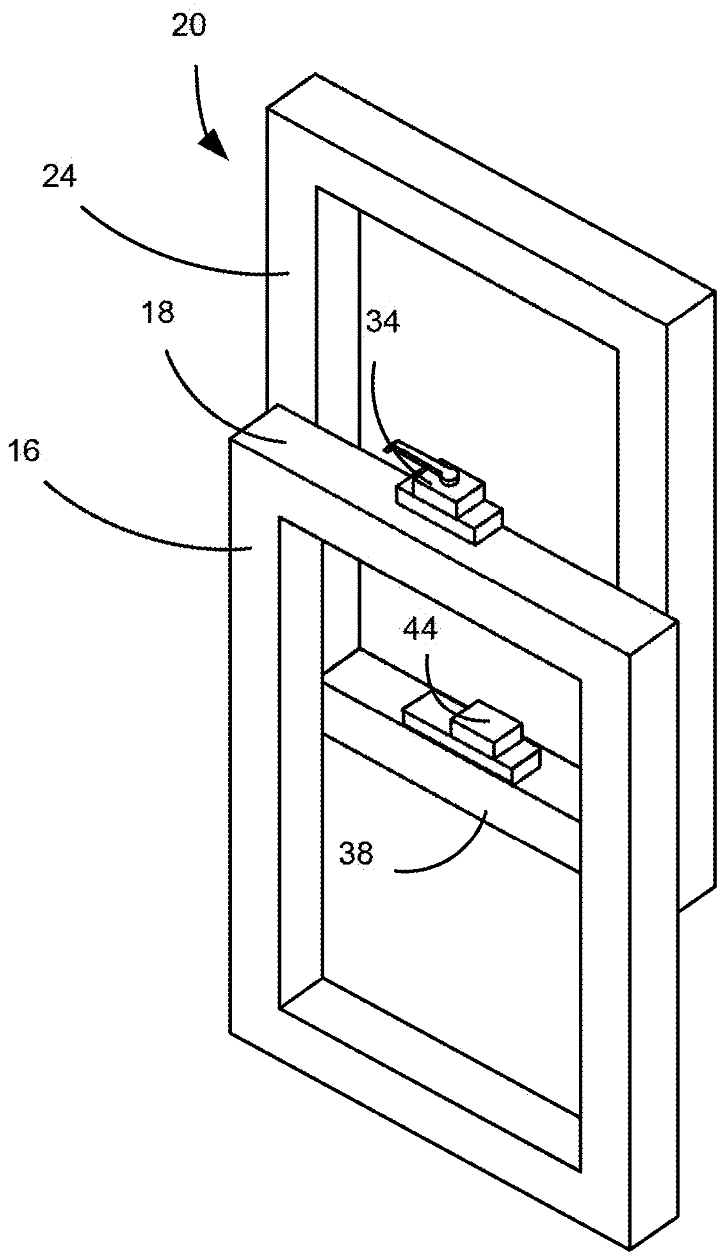
FIG. 15A is a perspective view of a window assembly in a first state of assembly, according to some embodiments.
Figure 15B:
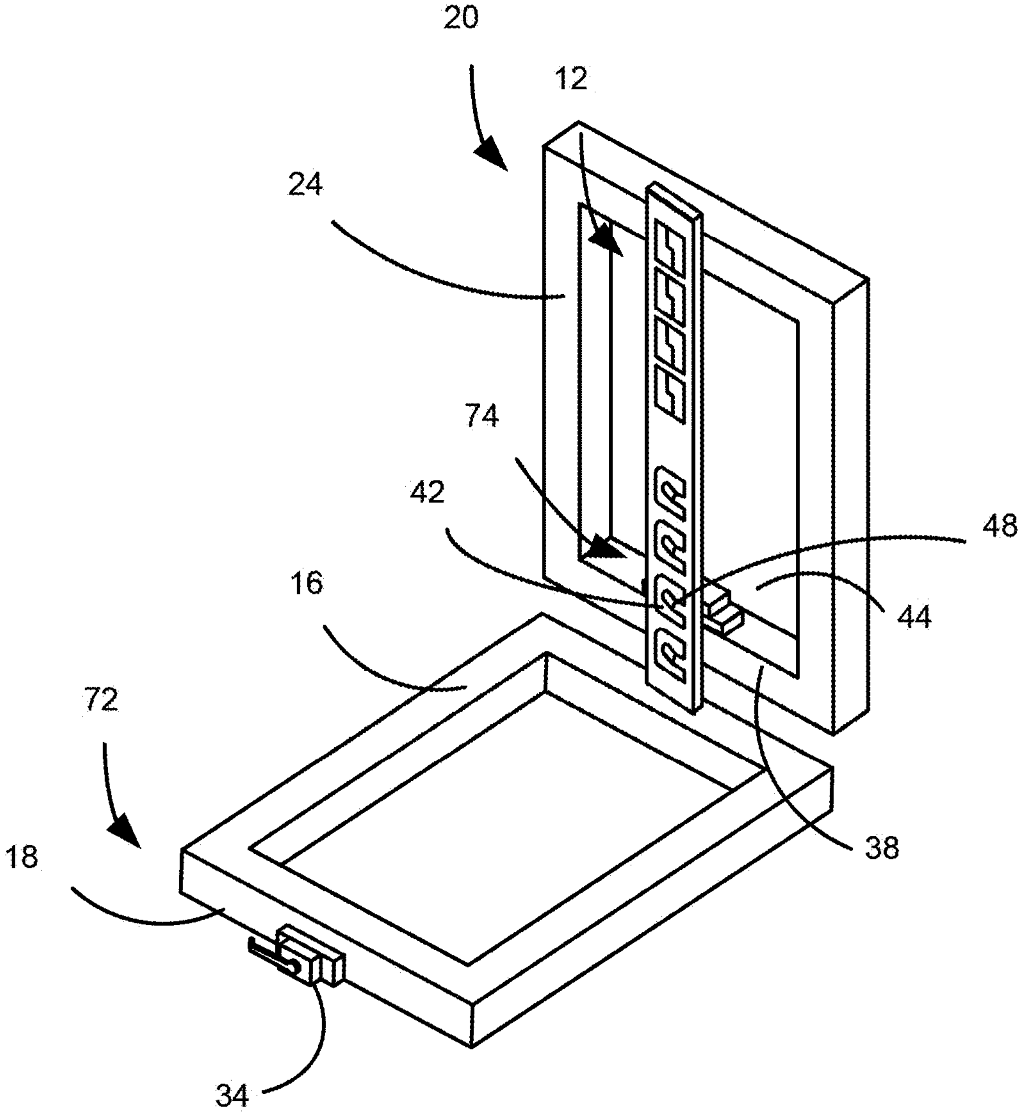
FIG. 15B is a perspective view of the window assembly of FIG. 15A in a second state of assembly with a first sash being detached from a second sash and the window latch installed on the second sash, according to some embodiments.

The process 100 includes removing a top rail (e.g., top rail 18) of the second sash from a window frame of the window assembly (step 104), according to some embodiments. In some embodiments, step 104 includes removing the second sash 16 as shown in FIGS. 15A-15B. Step 104 can be performed for a window assembly that includes both a first sash and a second sash. The top rail 18 of the second sash 16 may be configured to be removed from the window frame 52.

The process 100 includes coupling a window latch (e.g., a lever latch, a turn latch, a sash latch, a slide latch, a cam latch, etc.) with the first sash at a first point (step 106), according to some embodiments. In some embodiments, once the top rail 18 of the second sash 16 is removed from the window frame 52, the user may couple the curved member 48 of the first opening 42 of the window latch 12 to the window catch 44 positioned on the bottom rail 38 of the first sash 24 as shown in FIG. 15B. The curved member 48 may couple with the window catch 44 according to any of the methods listed above, or in other ways not previously listed.

Figure 15C:
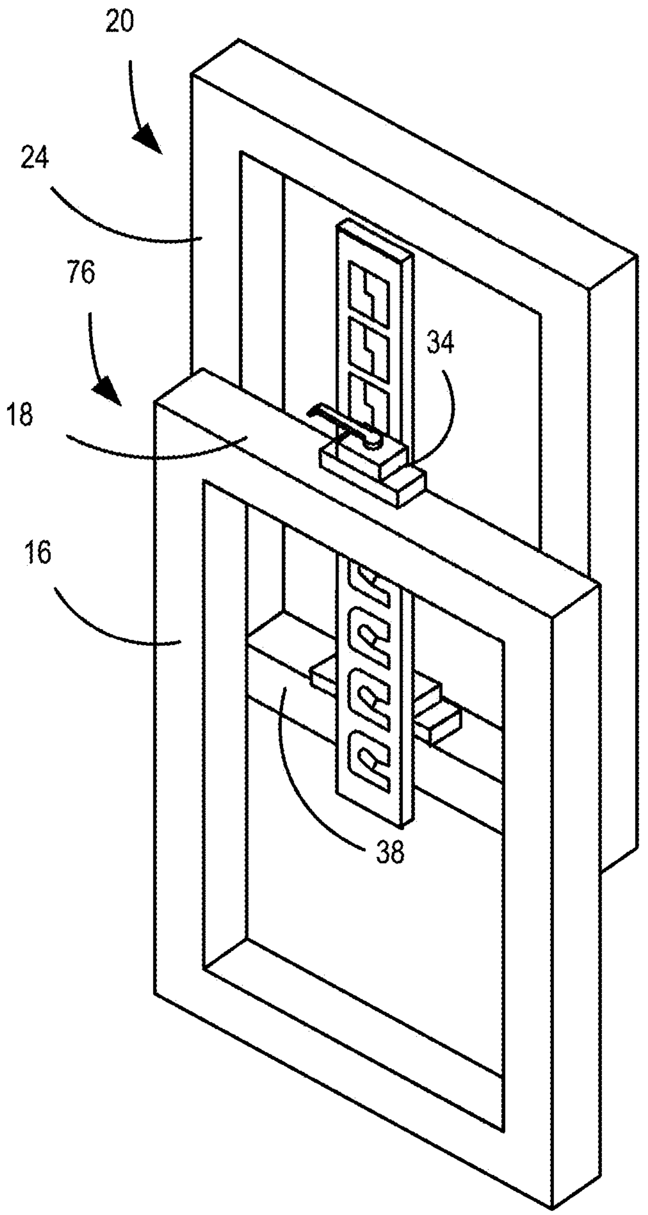
FIG. 15C is a perspective view of the window assembly of FIG. 15B in a third state of assembly where the first sash being re-secured to the first sash and coupled with the window latch, according to some embodiments.

The process 100 includes re-installing the top rail of the second sash to the window frame (step 108), according to some embodiments. In some embodiments, once the curved member 48 is coupled to the window catch 44 (step 106), the user may attach the top rail 18 of the second sash 16 to the first sash 24 as shown in FIG. 15C (step 108).

The process 100 includes translating the first sash and the second sash along a length of the window frame to a desired position for latching (step 110), according to some embodiments. In some embodiments, the desired position provides a desired amount of air flow (e.g., ventilation) or light. In some embodiments, step 110 includes translating the first sash 24 and the second sash 16 along the window frame 52 to a desired position for latching. The position for latching may be anywhere along the length of the window latch 12 such that the sash lock 34 is aligned to couple with any protrusion 28 of any second opening 40.

Figure 15D:
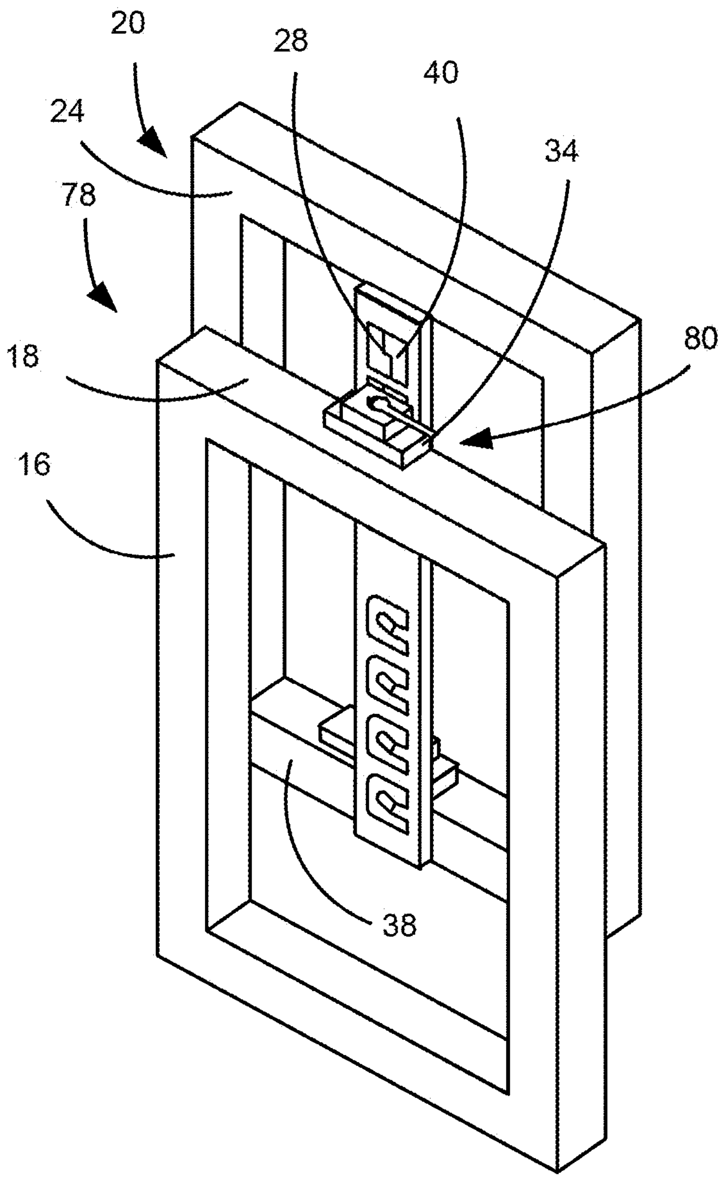
FIG. 15D is a perspective view of the window assembly of FIG. 15C with the first sash in an adjusted position relative to the position of the first sash in FIG. 15C, according to some embodiments.

The process 100 includes coupling the window latch with the second sash at a second point (step 112), according to some embodiments. In some embodiments, once the first sash 24 and the second sash 16 are in a desired position for latching, the user may actuate the arm 30 of the sash lock 34, to move the sash lock hook 54 from the first position to the second position, coupling the protrusion 28 to the sash lock 34 as shown in FIG. 15D. Once steps 104-112 of process 100 are completed, the window latch 12 is engaged and relative translation or movement of the first sash relative to the second sash or vice versa is limited. The above process 100 is in no way limiting. In some embodiments, the window latch 12 is provided as a kit for a window assembly. In some embodiments, a window assembly is provided with the window latch 12 as an additional member for achieving coupling of the first sash and the second sash at intermediate locations. Advantageously, the window latch 12 may facilitate enabling window assemblies that are incapable of being locked in an intermediate position to be held, or locked at partially open or partially closed positions. Thus, existing window assemblies may be modified to provide easy control over the opening position of the window assembly. In some embodiments, the window latch 12 may be used to repair window assemblies that have lost the ability (e.g., through wear, through damage, etc.) to lock in an intermediate position.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms “exemplary” and “example” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

Also, the term “or” is used in its inclusive sense (and not in its exclusive sense) so that when used, for example, to connect a list of elements, the term “or” means one, some, or all of the elements in the list. Conjunctive language such as the phrase “at least one of X, Y, and Z,” unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A window latch member for a window comprising:

a body having an elongated shape defining a first end and a second end, the first end comprising a plurality of first openings disposed along a first length of the body, wherein each opening of the plurality of first openings is configured to couple with a window catch of the window, the second end comprising a plurality of second openings disposed along a second length of the body, wherein each opening of the plurality of second openings is configured to couple with a sash lock of the window;

wherein the body is retrofit to the window, the window having a first sash and a second sash, the first sash comprising the window catch and the second sash comprising the sash lock;

wherein each of the plurality of second openings comprises a protrusion extending from an edge of the second opening, the protrusion configured to couple with the sash lock.

2. The window latch member of claim 1, wherein the second sash is repositionable between a fully open position and a fully closed position, the plurality of second openings configured to provide a plurality of coupling points for the sash lock to couple the second sash with the body such that the second sash is maintained at an intermediate position between the fully open position and the fully closed position.

3. The window latch member of claim 2, wherein:

when the second sash is in the fully open position, an opening is defined between a bottom of the second sash and a lower window sill of the window, a distance of the opening between the bottom of the second sash and the lower window sill having a maximum allowable value; and when the second sash is in the intermediate position and the sash lock is coupled with a corresponding one of the plurality of second openings, the distance of the opening between the bottom of the second sash is less than the maximum allowable value and is substantially equal to a height of an air conditioning unit.

4. The window latch member of claim 3, wherein the plurality of second openings are spaced to define a plurality of different intermediate positions, at least two of the plurality of different intermediate positions resulting in different values of the distance configured to accommodate a plurality of different sized air conditioning units.

5. The window latch member of claim 1, wherein the first sash is repositionable between a fully open position and a fully closed position, the plurality of first openings configured to provide a plurality of coupling points for the window catch to couple the first sash with the body such that the first sash is maintained at a position between the fully open position and the fully closed position.

6. The window latch member of claim 1, wherein the protrusion is offset from a centerline of the second opening.

7. The window latch member of claim 1, wherein the protrusion extends perpendicularly from a first edge.

8. The window latch member of claim 1, wherein each of the plurality of first openings comprises a curved member extending along a width of the first openings, the curved member configured to couple with the window catch.

9. A window assembly comprising:

a first sash and a second sash, wherein the first sash comprises a window catch and the second sash comprises a sash lock; and a window latch member comprising a body having an elongated shape defining a first end and a second end, the first end comprising a plurality of first openings disposed along a first length of the body, wherein each opening of the plurality of first openings is configured to couple with the window catch, the second end comprising a plurality of second openings disposed along a second length of the body, wherein each opening of the plurality of second openings is configured to couple with the sash lock, wherein each of the plurality of first openings comprises a curved member extending along a width of the first openings, the curved member configured to couple with the window catch.

10. The window assembly of claim 9, wherein the second sash is repositionable between a fully open position and a fully closed position, the plurality of second openings configured to provide a plurality of coupling points for the sash lock to couple the second sash with the body such that the second sash is maintained at an intermediate position between the fully open position and the fully closed position.

11. The window assembly of claim 10, wherein:

when the second sash is in the fully open position, an opening is defined between a bottom of the second sash and a lower window sill of the window assembly, a distance of the opening between the bottom of the second sash and the lower window sill having a maximum allowable value; and when the second sash is in the intermediate position and the sash lock is coupled with a corresponding one of the plurality of second openings, the distance of the opening between the bottom of the second sash is less than the maximum allowable value and is substantially equal to a height of an air conditioning unit.

12. The window assembly of claim 11, wherein the plurality of second openings are spaced to define a plurality of different intermediate positions, at least two of the plurality of different intermediate positions resulting in different values of the distance configured to accommodate a plurality of different sized air conditioning units.

13. The window assembly of claim 9, wherein the first sash is repositionable between a fully open position and a fully closed position, the plurality of first openings configured to provide a plurality of coupling points for the window catch to couple the first sash with the body such that the first sash is maintained at a position between the fully open position and the fully closed position.

14. The window assembly of claim 9, wherein each of the plurality of second openings comprises a protrusion extending from an edge of the second opening, the protrusion configured to couple with the sash lock.

15. A method for installing a window latch member on a window assembly comprising a first sash and a second sash, the method comprising:

removing an upper window rail of the second sash from a window frame;

installing a window catch on the first sash with a first opening disposed on a length of a body of the window latch member;

installing the upper window rail of the second sash to the window frame;

translating the first sash and the second sash along the window frame to a desired position for latching; and coupling a sash lock on the second sash with a second opening disposed on the length of the body of the window latch member;

wherein the first opening is one of a plurality of first openings disposed along the length of the body, wherein each of the plurality of first openings comprises a curved member extending along a width of the first opening, the curved member configured to couple with the window catch; and wherein the second opening comprises a protrusion extending from an edge of the second opening, the protrusion configured to couple with the sash lock.

16. The method of claim 15, wherein the second opening is one of a plurality of second openings disposed along the length of the body.

* * * * *